May 1, 1962 C. L. HANSON 3,031,983
CONTROL MEANS FOR LIQUID FERTILIZER APPLICATION
Filed May 15, 1958
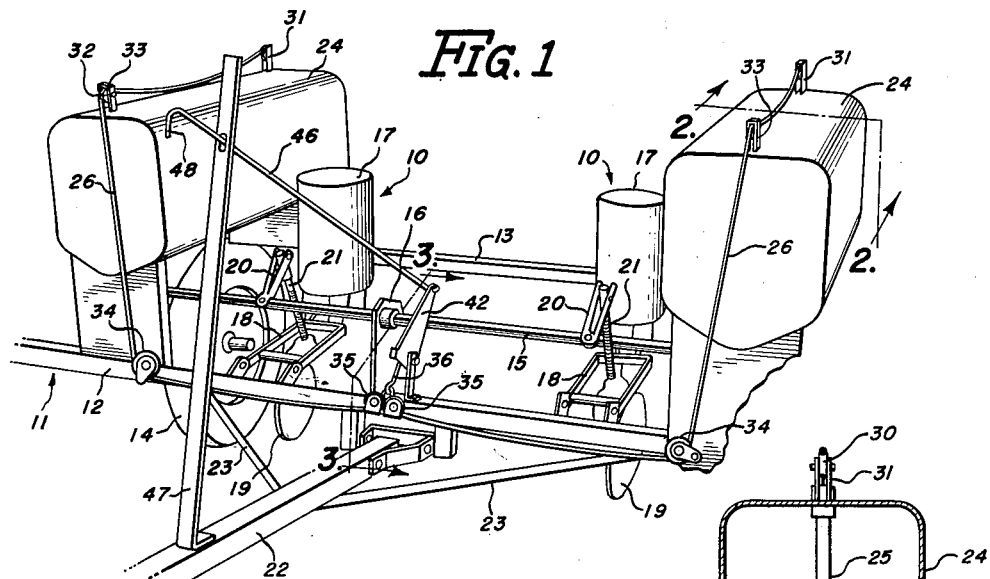
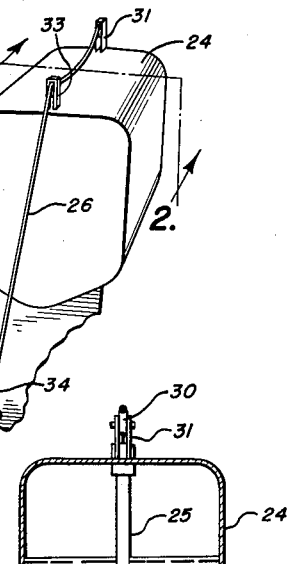
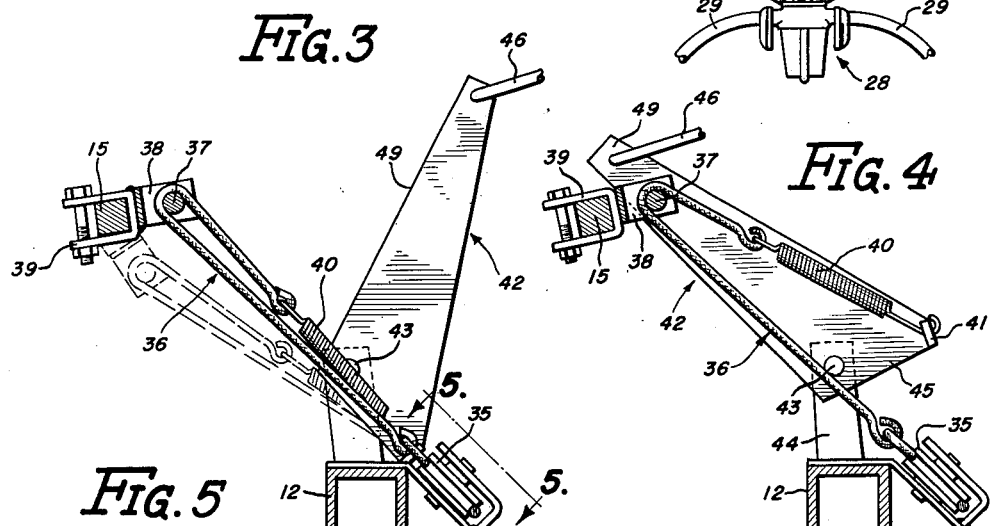
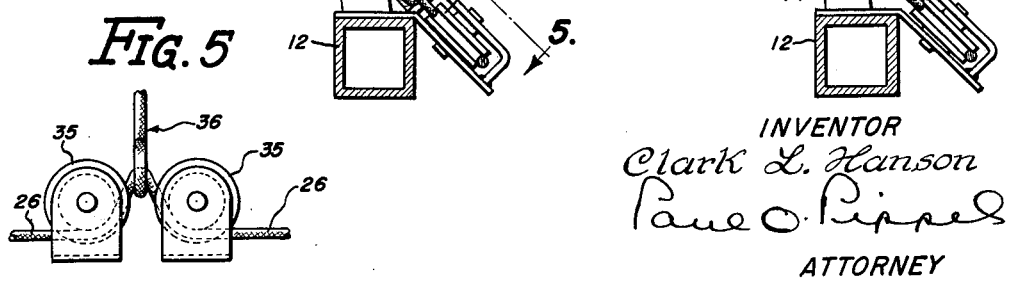
INVENTOR
Clark L. Hanson
Paul O. Pippel
ATTORNEY United States Patent Office 3,031,983
Patented May 1, 1962

3,031,983
CONTROL MEANS FOR LIQUID FERTILIZER APPLICATION
Clark L. Hanson, Downers Grove, Ill., assignor to International Harvester Company, Chicago, Ill., a corporation of New Jersey
Filed May 15, 1958, Ser. No. 735,606
2 Claims. (Cl. 111—67)

This invention relates to dispensers for liquid fertilizer and the like adapted for use with agricultural implements, and particularly to control means therefor.

In a liquid fertilizer attachment for a planter the liquid is discharged from a tank carried by the planter frame and a valve is provided which can be operated in conjunction with the raising and lowering means for the earth-working elements of the planter so that fertilizer is discharged only when the tools are in operation, the valve being closed when the tools are raised to transport position.

During planting it frequently occurs that the machine encounters an obstruction and stalls with the furrow openers in the round and the liquid fertilizer continues to flow. In order to lose as little fertilizer as possible the operator actuates his lifting apparatus, usually powered by the tractor ground wheels, and raises the implement to transport position to stop the flow of fertilizer. While this is being accomplished the implement is advancing over the ground and for several feet no fertilizer is deposited. The operator must then back up his machine, and since several feet of ground are traversed before the planter again reaches its lowered position the operator must retrace his steps to fertilize this area. It is therefore desirable to be able to stop the feeding of fertilizer at any time.

The present invention has for its object the provision of improved control means for a liquid fertilizer dispenser for an agricultaural implement wherein the foregoing disadvantages are avoided.

Another object of the invention is the provision, in a liquid dispensing attachment for an earth-working implement, of means interconnected between the tools and the dispensing apparatus for controlling the latter by the raising and lowering of the tools.

Another object of the invention is the provision, in a liquid dispensing attachment for an implement having earth-working tools, of means providing automatic opening and closing of the dispenser control valve in response to lowering and raising of the tools, and optionally operable means for disabling the automatic means so that the dispenser control means remains closed in either position of the tools.

Other objects and advantages of the invention will become clear from the following detailed description when read in conjunction with the accompanying drawings wherein:

FIGURE 1 is a perspective view of a portion of a multi-row planter of the trail-behind type having incorporated therein dispenser control means embodying the features of this invention;

FIGURE 2 is a section taken on the line 2—2 of FIGURE 1;

FIGURE 3 is a section taken on the line 3—3 of FIGURE 1;

FIGURE 4 is a view similar to FIGURE 3 showing another position of the parts; and FIGURE 5 is a section taken on the line 5—5 of FIGURE 3.

The implement shown in the drawings is a multi-row planter wherein a plurality of laterally spaced planting units 10 are mounted upon a transversely extending frame 11 comprising front and rear frame bars 12 and 13, respectively. In the drawing only a portion of the planter with which this invention is concerned is shown, many of the operating elements, including the power operated lifting apparatus, which may be a conventional half-revolution clutch type of lift actuated by ground wheels 14. Also removed for clarity are the drive elements for operating the seed dispensing mechanism of the planter units 10. It may be understood that these features operate in a conventional way, and that the lifting apparatus for raising and lowering the planter units 10 operates through a rockshaft 15 rockably supported in one or more brackets 16 carried by the planter frame.

Parts of the planter units 10 are also omitted for clarity, but it may be understood that they comprise generally a seed container 17, a frame structure 18, and furrow openers 19. A lift arm 20 affixed to the rockshaft 15 is connected by a rod 21 with the earth-working unit to raise and lower the latter by the rocking of the shaft 15. A hitch or draft bar 22 is connected to the front frame bar 12 of the implement and is adapted for connection in trailing relation to a tractive vehicle. Additional braces are provided in the form of straps 23.

A pair of laterally spaced tanks 24 containing liquid fertilizer are mounted on the planter frame between adjacent pairs of ground-working planter units 10.

One of the tanks 24 is shown in cross section in FIGURE 2 and it may be understood that each tank is provided with an opening to receive the upper end of a tube 25, the lower end of which projects downwardly into the fertilizer in the tank and serves as a guide for a cable 26, one end of which is connected to the stem 27 of a valve structure designated at 28 secured to the bottom of the tank and serving as the outlet through which fluid is discharged, the details of construction of which form no part of this invention. For the purposes of the present invention it may be understood that the valve assembly 28 is conventional and that vertical movement of the valve stem 27 opens and closes the valve to stop the flow of liquid or to allow it to flow through the valve and hose lines 29 connected thereto to adjacent planting elements 10 from which the liquid is directed to the soil.

Cable 26 is flexible and is passed over a roller 30 carried by a support 31 mounted on the outside of tank 24 at one end thereof and the cable extends over another pulley 32 mounted in another bracket 33 secured to the other end of tank 24.

Each of the cables 26 from adjacent tanks 24 is trained around another pulley 34 connected to the front frame bar 12 and is conducted toward the center of the machine where it travels around another pulley 35 and is connected to the end of another section of cable 36. Preferably the two sections of cable 26 leading to the tanks 24 constitute a single length of cable connected in the middle to the cable section 36.

The section of cable 36 is trained around a cylindrical member 37, serving as a pulley supported between a pair of rock arms 38 affixed to the shaft 15 by a clamp 39. The other end of the cable 36 is connected to a coil spring 40 which in turn is anchored at its other end at 41 to a generally triangular movable plate member 42.

Plate member 42 functions as a bell crank fulcrumed at 43 on a lug 44 affixed to and projecting upwardly from the frame member 12. Thus the distance between fulcrum 43 and the connecting point 41 for spring 40 constitutes one arm 45 of the bell crank 42.

In the solid line position of the rock arm 38 shown in FIGURE 3, the earth-working units 10 have been lowered to their operating position. The cable section 36 including spring 40 extends on a line from pulley member 37 to the anchor point 41 overcenter in one direction with respect to the fulcrum 43 of the triangular bellcrank member 42 and the latter is held in the position shown. When the earth-working elements are raised to transport position by rocking the shaft 15 to the dotted line position of arm 38 as shown in FIGURE 3, the distance between member 37 and point 41 is decreased, relaxing the tension on cable section 36 and allowing the valve 28 to close. However, as pointed out before, in order to avoid wasting fertilizer when the planter stalls in operation the operator finds it necessary to stop the flow of fluid while the planting elements are still in the ground because lifting requires the planter to travel a certain amount over the ground and if the flow of fluid is cut off automatically when the planter is lifted and automatically opened when the planter is lowered, not only is fertilizer wasted but part of the area covered is not fertilized at all. Therefore, a push rod 46 is provided which extends through an opening in an upright member 47 secured to the hitch 22 and has a handle 48 at its forward end within reach of the tractor operator by which the implement is drawn. The other end of the rod 46 is pivotally connected to the other arm 49 of bell crank 42, and when it is desired to manually close the valve 28 and have it remain closed as long as desired, the operator pushes rearwardly on the rod 46 swinging the bell crank into the position shown in FIGURE 4.

In the position of the rock arm 38 shown in FIGURE 4 the earth-working elements are in operation. The distance from point 37 to point 41 is shortened and the tension on cable section 36 is relaxed so that the valve closes. Furthermore, the valve remains closed as long as the bell crank 42 is in the position shown in FIGURE 4 because, upon swinging rock arm 38 to the dotted line position of FIGURE 3 to lift the planting units the cable section 36 remains relaxed so that the valve is not opened.

It is believed that the operation of the novel fertilizer dispenser control apparatus of this invention will be clearly understood from the foregoing description. It should likewise be understood, however, that the invention has been described in its preferred embodiment only, and that modifications may be made in the invention without departing from the spirit thereof or the scope of the appended claims.

What is claimed is:

1. In an implement including a frame and a tool movably mounted on the frame, a shaft rockably mounted on the frame, a lift arm mounted on said shaft and operatively connected to the tool to move the latter between operating and transport positions upon rocking the shaft, fertilizer dispensing apparatus including a tank mounted on the frame, a valve mounted in the wall of the tank in the path of fluid discharged therefrom for regulating the flow of fertilizer from the tank, a rock arm mounted on the shaft and rockable therewith between positions corresponding to said operating and transport positions of the tool, means operatively connecting said rock arm to said valve to open the latter when said rock arm is rocked to a position corresponding to the operating position of the tool and to close the valve when the rock arm is rocked to a position corresponding to the transport position of the tool, comprising a movable member mounted on the frame, means serving as a pulley on said rock arm, and a flexible cable trained around said pulley means and connected at one end to the valve and at the other end to said movable member, said movable member being movable between two positions, in one of which positions the distance between the pulley means on the rock arm and the point of connection of the cable to the movable member is large enough to place the cable under tension and close the valve when said rock arm is rocked to a position corresponding to the transport position of the tool and small enough to relieve the tension on the cable and open the valve when the rock arm is rocked to a position corresponding to the operating position of the tool, and in the other of which positions of the movable member the distance between the pulley means on the rock arm and the point of connection of the cable to the movable member is small enough in both positions of the rock arm to relieve the tension on the cable and keep the valve closed.

2. The invention set forth in claim 1, wherein the movable member is a bell crank fulcrumed on the frame, and one end of said cable is anchored to one arm of said bell crank, and wherein means is connected to the other arm of said bell crank for optionally swinging the latter to said other position wherein the distance between the pulley means on said rock arm and the point of connection of the cable to the bellcrank is small enough in both positions of the rock arm to relieve the tension on the cable and keep the valve closed.

References Cited in the file of this patent

UNITED STATES PATENTS

| | | |
|---|---|---|
| 508,321 | Johnson | Nov. 7, 1893 |
| 1,294,629 | Davis | Feb. 18, 1919 |
| 2,768,773 | Bjerre | Oct. 30, 1956 |
| 2,888,891 | Ackley | June 2, 1959 |
| 2,890,667 | Loomans | June 16, 1959 |
| 2,943,584 | Palmer | July 5, 1960 |

OTHER REFERENCES

John Deere Operators Manual OM–D44–158, received in Scientific Library Jan. 21, 1958, only pages 4, 5, 15 and 29 required.